INVENTOR.
CHARLES C. REYNOLDS
BY
Head & Johnson
ATTORNEYS

United States Patent Office 3,522,746
Patented Aug. 4, 1970

3,522,746
SAFETY DEVICE FOR VEHICLES
Charles C. Reynolds, 4350 W. 8th St.,
Tulsa, Okla. 74127
Filed Nov. 7, 1968, Ser. No. 774,111
Int. Cl. G05g 5/06
U.S. Cl. 74—526        2 Claims

ABSTRACT OF THE DISCLOSURE

This invention relates to a safety device for use on vehicles such as trucks having a control element mounted on the rearward side of the vehicle dashboard, the control element having a control valve extending through the opening of the dashboard, the invention providing a locking plate pivoted to the dashboard and having a projection which prohibits the control lever from being inadvertently moved from a first to a second position and including means wherein the locking plate can be pivoted out of engagement with the control lever when it is desired to move the control lever from the first to the second position.

CROSS REFERENCE

This application is not related to any pending United States or foreign application.

SUMMARY AND BACKGROUND OF THE INVENTION

Many vehicles, and particularly large trucks, include apparatus which is controlled from the vehicle cab by means of pneumatic or hydraulic valves. Typically these valves are mounted on the rearward side of the truck dashboard and have a hand operated lever which extends through an opening in the dashboard. Such valves are utilized to lock or unlock inter-axle differentials, cab controlled fifth wheels, and to position in or out deep reduction gears. It is sometimes necessary for the drivers of vehicles including such equipment as an inter-axle differential to change the differential from the unlocked to the locked position while driving under hazardous conditions. This means that the driver must be able to reach out and move the control lever which controls the inter-axle differential control valve without taking his eyes off the road.

Under certain conditions moving the control lever of the inter-axle differential control valve accidentally can be exceedingly hazardous and many accidents have been reported wherein the driver inadvertently moved the inter-axle differential control lever from the unlocked to the locked position.

The same danger occurs when other control devices such as cab control fifth wheels, deep reduction gears and so forth, are inadvertently moved as the vehicle is moving.

This invention provides a device which can readily be mounted on the dashboard of a truck or other vehicle to prevent the inadvertent actuation of a control valve or any other type of control lever.

It is therefore an object of this invention to provide a safety device for use on vehicles, such as trucks.

A more specific object of the invention is to provide a safety device for use on vehicles, such as trucks, having a control element mounted on the rearward side of the vehicle dashboard, the control element having a control lever extending through an opening in the dashboard, the device providing means for preventing the control lever from being inadvertently moved from a first to a second position.

These and other objects of the invention will be understood by reference to the following description and claims, taken in conjunction with the attached drawings.

DESCRIPTION OF THE VIEWS

DETAILED DESCRIPTION

Figure 1:
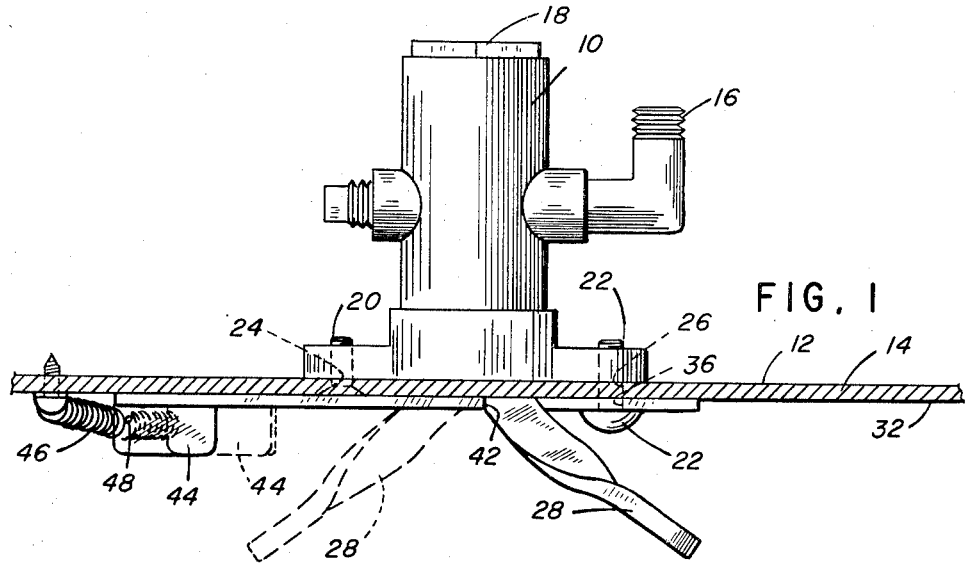
FIG. 1 is a top view of a control element, in this instance a valve utilized to control pneumatic or hydraulic fluid flow, mounted on the rearward side of the dashboard of a vehicle, the dashboard being shown in cross-section, and showing a top view of the safety device of this invention.

Referring to the drawings, a control element 10 is shown affixed to the rearward surface 12 of a vehicle dashboard 14. The control element 10 is in the form of a pneumatic or hydraulic valve controlling the flow of fluid through a first opening 16 and a second opening 18, opening 18 not being seen since it extends rearwardly out of the control element. The control element 10 is illustrated as normally used to control hydraulic or pneumatic fluid flow and may be utilized to control an inter-axle differential, a cab control fifth wheel, deep reduction gears, or any other such similar type of device which is controlled by the operator from the cab of a vehicle. While the control element 10 is illustrated as being formed of a valve, it can be seen that the control element 10 may be in the form of a switch controlling the flow of electricity.

Normally the control element 10 is mounted to the rearward surface of the dashboard 14 by means of bolts 20 and 22 which extend through openings 24 and 26 in dashboard 14. Bolt 20 is shown as having a recessed head while bolt 22 is shown as having a rounded head.

The control element 10 includes a control lever 28 which extends through an opening 30 in the dashboard 14. The control lever 28 is movable between a first and second position, the first position being shown in solid lines and the second position in dotted lines.

As has been previously indicated, the operator of a vehicle including control element 10 may be required to move the control lever 28 during times when he must not take his eyes off the road. Since many vehicles may have a number of control elements it is very easy for the operator to inadvertently move the wrong control element or for the element to be moved when it is not intentionally desired that it be moved. This invention provides means for attaching to the front surface 32 of dashboard 14 to prevent the inadvertent movement of the control lever 28 from a first to a second position.

Basically the safety device of this invention includes a flat locking plate 34 having an opening 36. The opening receives bolt 22 and thereby the locking plate 34 is pivotally supported contiguous to the front surface 32 of the dashboard 14.

Locking plate 34 has a locking edge 38 defining a uniplanar projecting portion 40 which provides a locking curb edge 42.

The locking plate 34 further includes an integral perpendicular extending thumb engaging portion 44.

A spring extends between the locking plate 34 and the dashboard 14 and urges the locking plate 34 pivotally upwardly in engagement with the control lever 28. In the preferred arrangement the thumb engaging portion 44 includes an opening 48 which receives one end of spring 46, the other end of the spring being affixed to the dashboard 14 by means of a screw 50.

OPERATION

Figure 2:
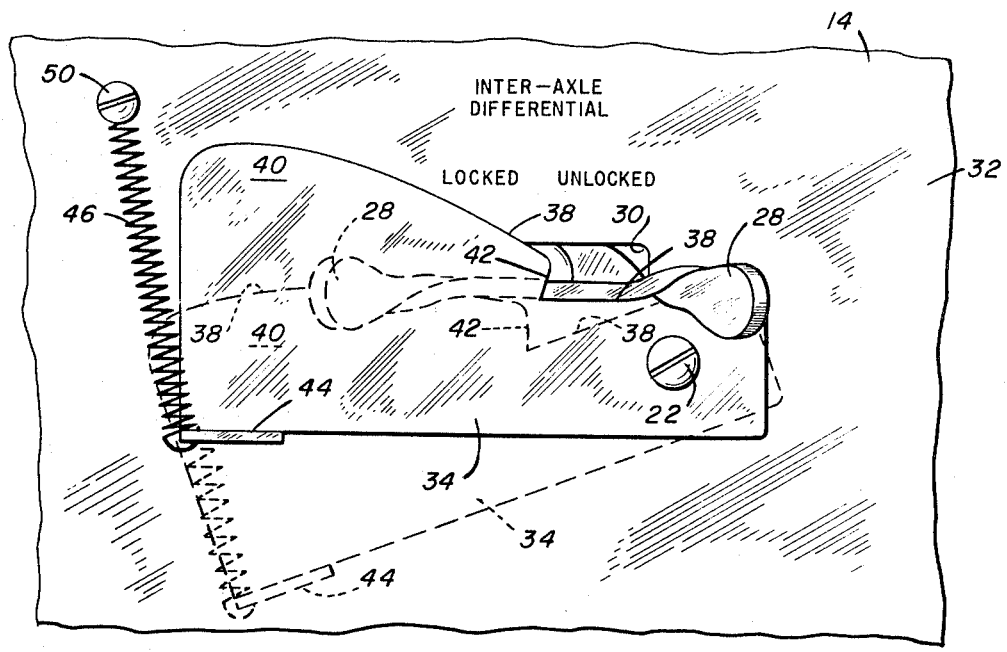
FIG. 2 is a front view of a portion of a dashboard of a vehicle equipped with the safety device of this invention.

In FIG. 2 the safety device of this invention is shown with the control lever 28 in solid lines in the first position.

With the locking plate in the position shown the control lever 28 cannot be moved to the second position since it is restrained by the locking curb edge 42. When the operator desires to move the control lever 28 to the second position he must first move the locking plate 34 pivotally downwardly as shown in dotted outline. This is done by the operator placing his thumb against perpendicular projection 44 and pushing downwardly, extending spring 46. When the locking plate is pushed downwardly the control lever 28 may be easily moved into the second position by means of the index finger. The movement of the control lever 28, however, requires two intentional sequential actions, that is, first pivoting the locking plate 34 and then moving the control lever 28. If the operator accidentally hits control lever 28 without first pivoting locking plate 34 the control lever cannot be moved into the second position.

With the control lever 28 in the second position the projecting portion 40 of the locking edge 38 engages the lower surface of the lever. When the lever 28 is moved back to the first position the locking plate 34 automatically snaps back upwardly and locks the lever 28 against movement back to the second position.

In the illustrated arrangement the locking plate is configured to prevent inadvertent movement from right to left of lever 28. It can be seen that the same arrangement with a different configured locking plate can be utilized to prevent movement of lever 28 from the left to right position, the up to down position, or the down to up position.

The invention is the ultimate of simplicity. It is extremely cheap to construct and can be installed in seconds. At the same time, however, it is completely effective to prevent the inadvertent movement of a control lever and therefore has a significant safety advantage to the user.

This invention has been described with a certain degree of particularity although it is manifest that many changes may be made in the details of construction and the arrangement of components without departing from the spirit and scope of the invention.

What is claimed is:

1. A safety device for use on vehicles, such as trucks, having a control element mounted on the rearward side of the vehicle dashboard, the control element having a control lever extending through an opening in the dashboard, the lever being pivotally movable from a first to a second position, the safety device serving to prevent the inadvertent movement of the control lever from the first to the second position, the device comprising:

a flat locking plate having an opening therein, one edge portion of the locking plate providing a locking edge defining a uniplanar projecting portion providing a locking curb edge, and the locking plate having an integral perpendicularly extending thumb engageable portion spaced from said opening;

a screw member engaging the truck dashboard and received in said opening in said locking plate, said screw member pivotally supporting said locking plate contiguous and parallel with the truck dashboard, the said locking edge including said projecting portion being contiguous with the control element control lever; and a spring extending from said locking plate to the truck dashboard urging the locking plate locking edge into engagement with said control lever, said locking curb edge preventing the pivotation of the control lever from a first to a second position until said locking plate is pivoted away from the control lever.

2. A safety device for use on vehicles according to claim 1 wherein said integral perpendicularly thumb engaging portion of said locking plate has an opening therein, such opening receiving one end of said spring.

References Cited

UNITED STATES PATENTS 2,900,836   8/1959   Gleeson et al. _____ 74—526 XR
2,977,816   4/1961   Rice.

FRED C. MATTERN, JR., Primary Examiner

F. D. SHOEMAKER, Assistant Examiner

U.S. Cl. X.R.

74—566